(12) United States Patent
Yu et al.

(10) Patent No.: US 10,345,995 B2
(45) Date of Patent: Jul. 9, 2019

(54) ENHANCED GRAPHICAL DISPLAY CONTROLS FOR USER INTERFACE

(71) Applicant: salesforce.com, inc., San Francisco, CA (US)

(72) Inventors: Shengze Yu, Foster City, CA (US); Shradha Kohli, San Francisco, CA (US); Gautam Vasudev, San Francisco, CA (US)

(73) Assignee: salesforce.com, inc., San Francisco, CA (US)

(*) Notice: Subject to any disclaimer, the term of this patent is extended or adjusted under 35 U.S.C. 154(b) by 217 days.

(21) Appl. No.: 14/965,768

(22) Filed: Dec. 10, 2015

(65) Prior Publication Data

US 2017/0168683 A1 Jun. 15, 2017

(51) Int. Cl.
*G06F 3/0484* (2013.01)
*G06F 3/0482* (2013.01)

(52) U.S. Cl.
CPC .......... *G06F 3/0482* (2013.01); *G06F 3/0484* (2013.01); *G06F 2203/04803* (2013.01); *G06F 2203/04806* (2013.01)

(58) Field of Classification Search
CPC combination set(s) only.
See application file for complete search history.

(56) References Cited

U.S. PATENT DOCUMENTS

| 7,234,107 | B1 * | 6/2007 | Aoki | G06F 16/9577 |
| | | | | 715/207 |
| 7,327,349 | B2 * | 2/2008 | Robbins | G06F 3/0481 |
| | | | | 345/156 |
| 8,907,886 | B2 * | 12/2014 | Robbins | G06F 3/0481 |
| | | | | 345/156 |
| 9,785,342 | B2 * | 10/2017 | Muller | G06F 3/04883 |
| 2002/0089550 | A1 * | 7/2002 | Orbanes | G06F 3/0346 |
| | | | | 715/853 |
| 2005/0195154 | A1 * | 9/2005 | Robbins | G06F 3/0481 |
| | | | | 345/156 |
| 2005/0197763 | A1 * | 9/2005 | Robbins | G06F 3/0481 |
| | | | | 345/169 |
| 2006/0020883 | A1 * | 1/2006 | Kothari | H04L 67/306 |
| | | | | 715/234 |
| 2006/0244638 | A1 * | 11/2006 | Lettau | G01C 21/367 |
| | | | | 340/995.1 |

(Continued)

*Primary Examiner* — Hien L Duong
(74) *Attorney, Agent, or Firm* — Meyertons, Hood, Kivlin, Kowert & Goetzel, P.C.

(57) ABSTRACT

A user of an application can affect the control structure of an application by changing a level of detail setting. When a level of detail is altered relative to a graphical region, additional information and functionality may become available, while previously displayed information and/or functionality for a different graphical region may become hidden or otherwise unavailable. A user may repeatedly enhance a level of detail at which a particular application region is shown by repeatedly using an appropriate user input command. The present disclosure does not simply change a user's view of an application, but changes the way the application itself functions in various embodiments when a level of detail is altered for a graphical region. Techniques described herein may apply to a web application, or to any other suitable computer application.

16 Claims, 13 Drawing Sheets

(56) References Cited

U.S. PATENT DOCUMENTS

| | | | | |
|---|---|---|---|---|
| 2009/0037838 A1* | 2/2009 | Gedye | ................... | G06Q 30/02 |
| | | | | 715/777 |
| 2009/0128483 A1* | 5/2009 | Robbins | ............... | G06F 3/0481 |
| | | | | 345/156 |
| 2009/0193356 A1* | 7/2009 | Saba | ................... | G06F 3/0485 |
| | | | | 715/801 |
| 2011/0145717 A1* | 6/2011 | Joo | ................... | G06F 16/9577 |
| | | | | 715/738 |
| 2011/0264736 A1* | 10/2011 | Zuckerberg | ............ | G06Q 30/02 |
| | | | | 709/204 |
| 2013/0211970 A1* | 8/2013 | Glass | ............... | G06Q 30/0641 |
| | | | | 705/27.1 |
| 2013/0325671 A1* | 12/2013 | Glass | ............... | G06Q 30/0641 |
| | | | | 705/27.1 |
| 2015/0106225 A1* | 4/2015 | Glass | ................... | G06Q 20/12 |
| | | | | 705/26.7 |
| 2015/0212712 A1* | 7/2015 | Robbins | ............... | G06F 3/0481 |
| | | | | 715/788 |

* cited by examiner

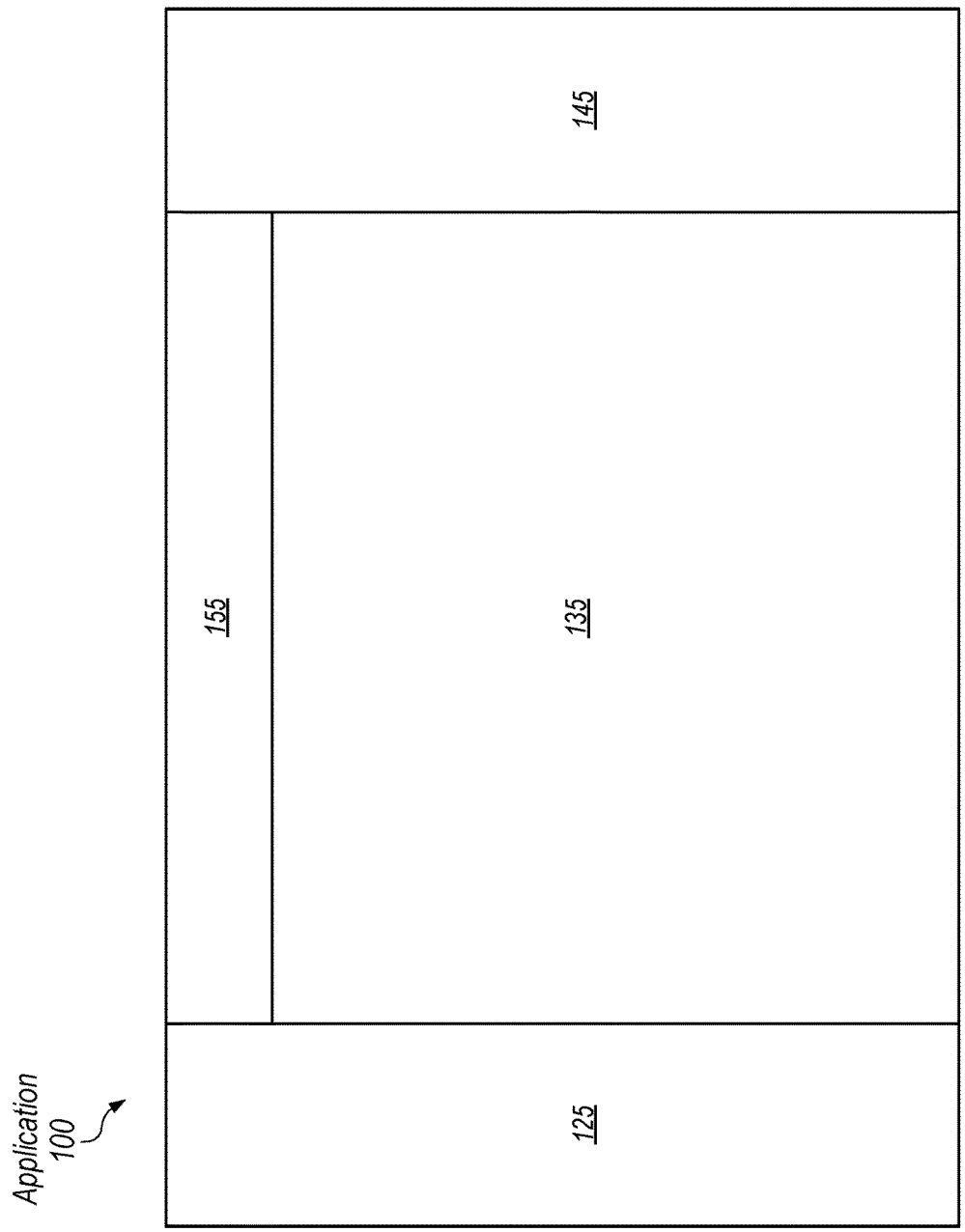

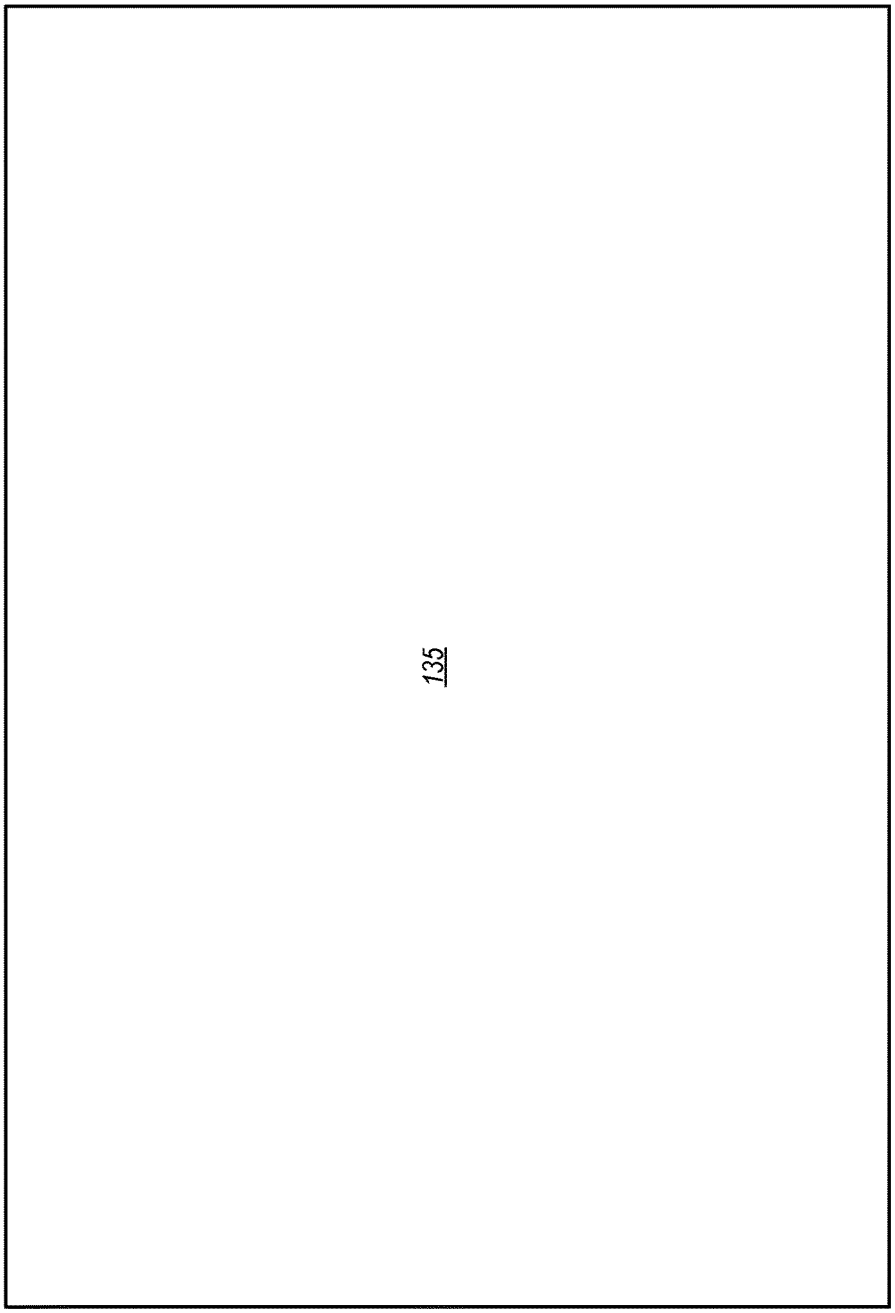

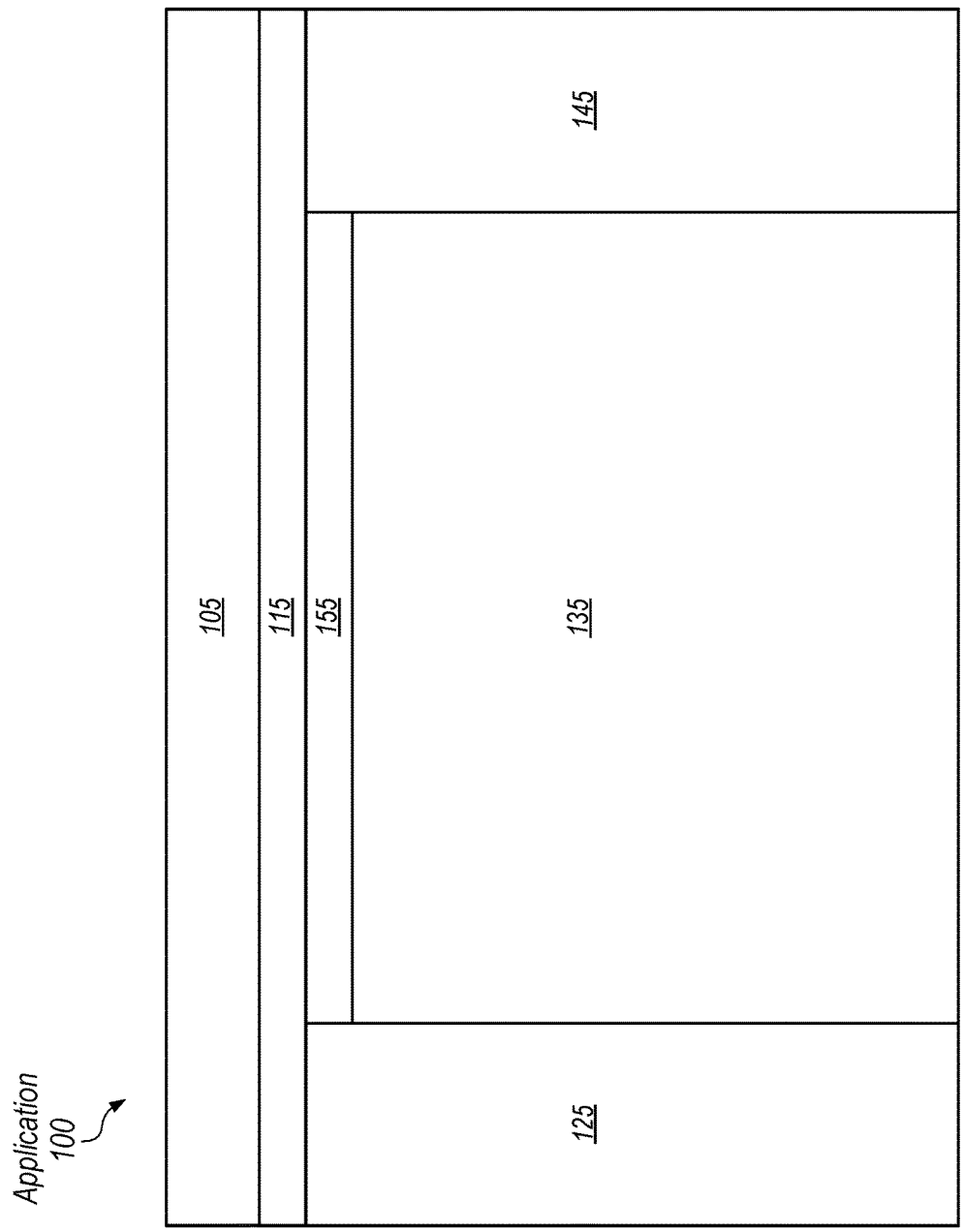

ENHANCED GRAPHICAL DISPLAY CONTROLS FOR USER INTERFACE

TECHNICAL FIELD

This disclosure relates to graphical user interface display technology, and more particularly to facilitating display and navigation of one or more displayed graphical regions of a user interface.

BACKGROUND

Computer applications typically include a graphical interface that displays information to a user. Frequently, such an interface may be fixed in various aspects of its appearance. A portion of the user's screen that is used to display certain data may always be of a particular size, for example.

In some instances, users may be able to change an application from a first view to a second type of view. However, these views may still be inflexible in terms of how information is presented to a user.

Further, changing from one view to a second view may require a specific type of command, while changing back from the second view to the first view may require an entirely different type of command. In general, user options to view and navigate various aspects of an application may be constrained, cumbersome, and prevent the user from interacting with application data in a fully expansive manner. Such shortcomings may be particularly apparent in the context of a web application that executes within a web browser.

BRIEF DESCRIPTION OF THE DRAWINGS

FIGS. 1A-1D illustrate a view of a user screen at different points in time, according to some embodiments.

DETAILED DESCRIPTION

Computer applications, including web applications, frequently suffer from the problem of either not having enough information and functionality accessible at one time, or appearing crowded and complicated by presenting too much to a user at once. The present specification describes techniques and structures that allow a user to change a level of detail at which information is displayed for part of an application, however. This may allow a user to "zoom" in on a region of the application that the user is interested in, while simultaneously removing or reducing information shown relative to other regions of the application.

In some cases, a user may repeatedly enhance a level of detail at which a particular application region is shown. This may allow a user to drill down further and further into what information is displayed and/or allow additional functionality to become accessible. If the user reaches a maximum pre-determined level of detail, an additional iteration of an input command may restore the user's view to an initial default view (thus, navigation of the information hierarchy in an application may be cyclical).

Existing techniques do not allow such flexible enhancement of graphical regions for an application. Simply increasing a viewing magnification (for example, changing a view in a word processor program from 100% zoom to 150% zoom) does not increase an amount of data items that are shown to a user, or allow access to additional functions. The present disclosure thus does not simply change a user's view, but changes the way an application itself functions when a level of detail is altered for a graphical region, in various embodiments. More detail is provided below.

\* \* \*

Turning to FIGS. 1A-1D, illustrations of a view of a user screen at different points in time are shown. These illustrations show, in some embodiments, how graphical regions may be manipulated to vary in presentation to a user. Further detail is then provided relative to FIGS. 2A-2D.

Figure 1A:
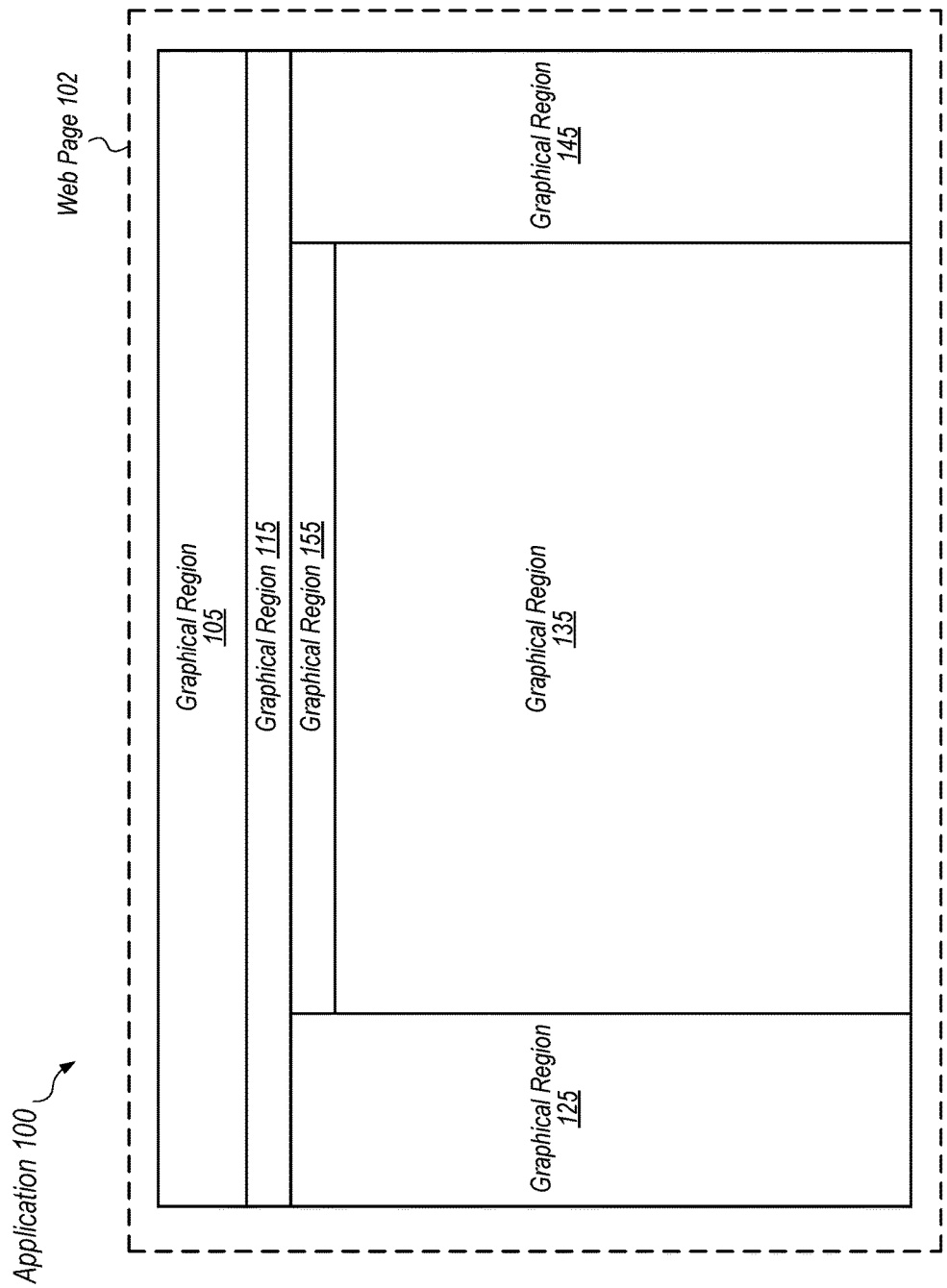

As shown, FIG. 1A includes an application 100 that includes various different graphical regions 105, 115, 125, 135, 145, and 155. Web application 100 may include a web page 102 in various embodiments.

Application 100 may run as software instructions executed by a user device in one embodiment. Some or all of these software instructions may be downloaded from SALESFORCE.COM, in one example, but can be downloaded from any source. In some instances, software instructions comprising application 100 may be executed from within a user web browser, or as part of another program. Application 100 may also include one or more software components that reside on another system, such as server. In general, application 100 may be flexibly implemented on one or multiple different networked systems and is not limited to one particular configuration.

Application 100 is therefore a web application, in one embodiment, but aspects of techniques described herein also apply to a standalone computer system as well. Further, one or more portions of software code corresponding to web application 100 may be stored on one or more computer-readable media as described herein. In one embodiment, application 100 includes web page 102 (and in various embodiments, may include multiple web pages).

In FIG. 1A, a first view of application 100 is shown. This view may be shown on part (or all) of a display screen of a computing device, and may be shown within all or a portion of a web browser.

The view of FIG. 1A shows application 100 as including graphical regions 105, 115, 125, 135, 145, and 155. Each graphical region may show one or more data items (in any presentation format), and may have one or more associated commands that can be executed to cause an action within application 100. These graphical regions may be defined using data structures that are part of a web page, or any other way that would occur to one of skill in the art.

A user may be presented with a large amount of simultaneous information when viewing the six different graphical regions shown in FIG. 1A. Showing six different graphical regions also means that in some cases, information for one or more of the graphical regions shown may be hidden, truncated, or otherwise omitted from the user's view due to screen size limitations.

Turning to FIG. 1B, a second view of application 100 is shown. In this view, application 100 is shown with visible graphical regions 125, 135, 145, and 155. Application 100 transitions from the view of FIG. 1A to the view of FIG. 1B in response to a user input command in the embodiment shown.

Note that graphical regions 105 and 115 were previously visible in FIG. 1A, but are no longer depicted on the user's screen in FIG. 1B. Meanwhile, any one (or more) of remaining visible graphical regions 125, 135, 145, 155 may be shown with additional data, additional inputs or controls, or other additional details. All or part of these regions may also become larger visually in response to a user command that causes the transition in view. Additional details in these regards are presented below. Also note that although web page 102 is not explicitly depicted in figures other than 1A, the views of FIGS. 1B-2D may all be a part of web page 102 in various embodiments.

Advantageously, web page 102 is configured in one embodiment such that when a user's view changes, the web page does not need to re-load within a user's web browser to effectuate the changed view. Thus, the transition from FIG. 1A to FIG. 1B does not require a user device sending a request to a server system, for example, and waiting to receive a new or modified web page from the server. Instead, operations for changing a user's view may simply be performed locally on a user device with no need to fetch additional data from a web server, in various instances.

Turning to FIG. 1C, another view of application 100 is shown after a further iteration of a user input command is received by application 100. In this figure, graphical regions 125, 145, and 155 have also been hidden from view, while graphical region 135 is expanded in view (and may include additional data, controls, inputs, visuals, etc.).

Turning to FIG. 1D, a view of application 100 is shown after another iteration of a user input command that alters the graphical interface is received by application 100. FIG. 1D is identical to the view of FIG. 1A. Thus, in this instance, the user's view has reverted to the same graphical configuration that is shown on FIG. 1A. Repeated application of a user input command can therefore cause the user's view to cycle, in various embodiments, from a higher level overview of several graphical regions, to lower-level views where certain graphical regions may be expanded and contain greater data and functionality.

Turning to FIGS. 2A-2D, a series of figures illustrate another view of a user screen at different points in time, with graphical regions displayed at varying levels of detail. These figures are similar to those of FIGS. 1A-1D, but include additional detail for clarity of description.

Figure 2A:
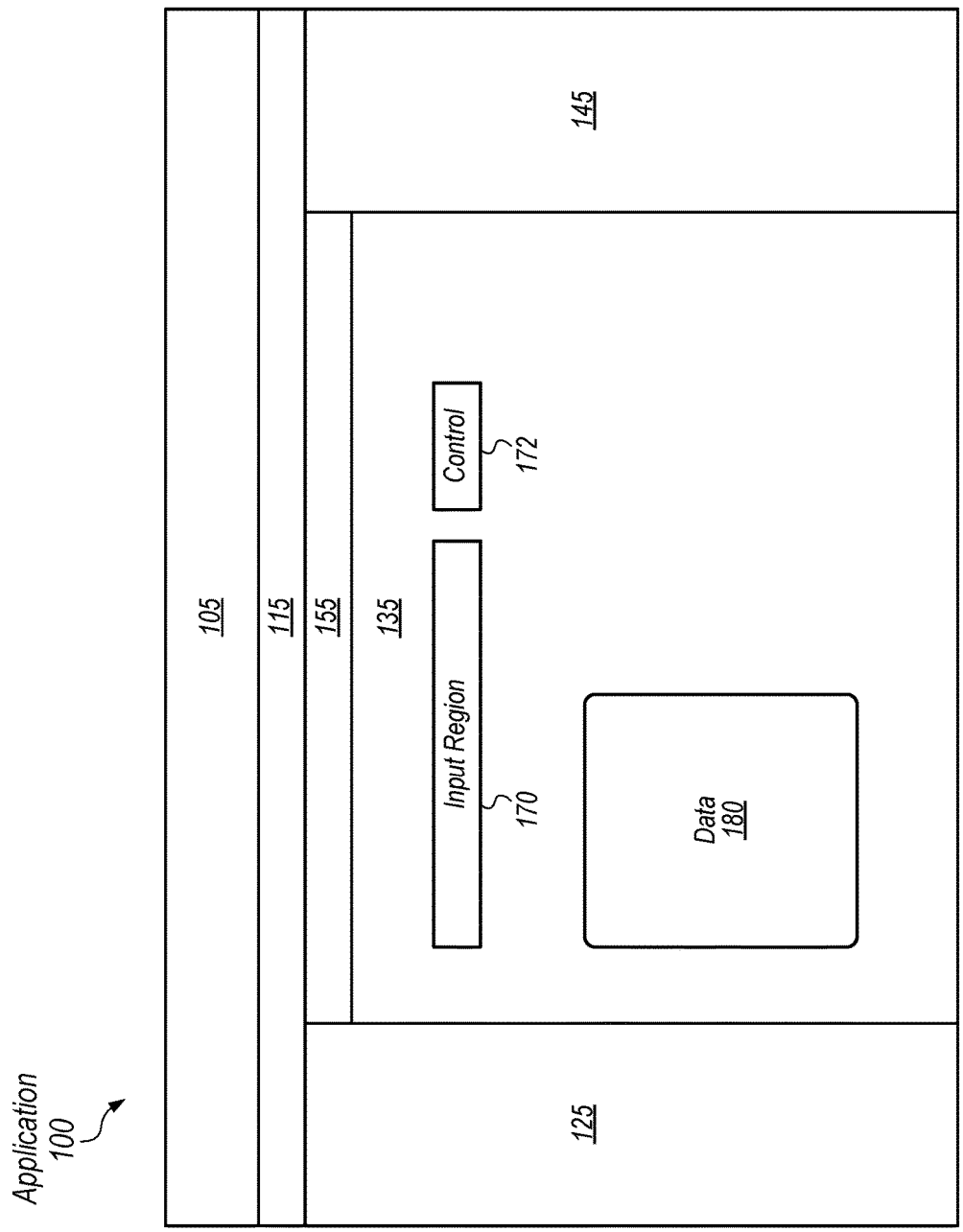
FIGS. 2A-2D illustrate another view of a user screen at different points in time, with additional details shown, according to some embodiments.

In FIG. 2A, a view of application 100 is shown. This view may be shown on part (or all) of a display screen of a computing device, and may be shown within a portion of a web browser.

The view of FIG. 2A shows application 100 as including graphical regions 105, 115, 125, 135, 145, and 155. In this embodiment, graphical region 135 is shown at a first level of detail, and includes several elements: an input region 170, a control element 172, and a data set 180. Generally, any graphical region may have any number of inputs, controls, data, or other elements, each of which may or may not be visible depending on a level of detail for that graphical region. In the embodiment shown, input region 170 is configured to accept user input via one or more user input devices (e.g., mouse, keyboard, touchscreen, etc.). Control element 172 is configured to cause one or more actions to occur for application 100, and data set 180 is configured to display one or more data elements (which may be from a database such as multi-tenant database 616, discussed further below).

Figure 2B:
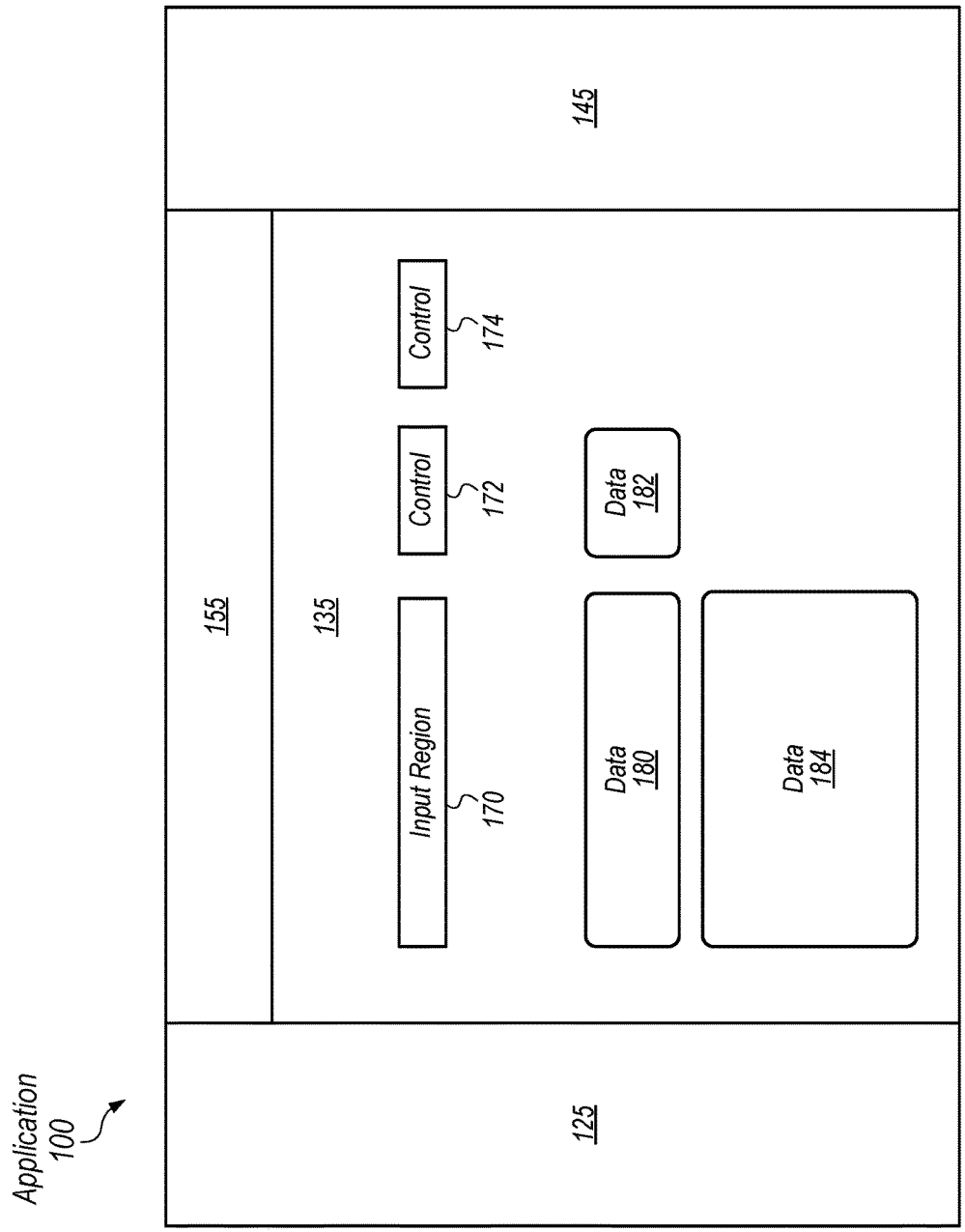

Turning to FIG. 2B, the view of application 100 has transitioned. This transition may occur in response to a particular user input command. In this view, only graphical regions 125, 135, 145, and 155 are shown, while regions 105 and 115 are hidden from view. Further, graphical region 135 is shown at a second level of detail that is greater than the first level of detail in which that region is shown in FIG. 2A. At this second level of detail, graphical region 135 appears with the addition of control element 174, and data sets 182 and 184 (each of which has one or more elements of data). The overall visual appearance of graphical region 135 also may or may not be different when shown at the second level of detail (as further discussed below).

Note that the decision to expand graphical region 135 may be made by a user, or made automatically, in various embodiments, and as further discussed below. For example, graphical region 135 can be selected by the user for enhancement, or can be automatically selected by code (e.g., graphical region 135 may be selected by default, and/or based on contextual rules about which regions are currently visible to a user). Thus, in embodiments in which the system automatically decides which regions to graphically enhance, one or more rules may specify one or more criteria to make this determination. These criteria may include size of the total visible page, size of one or more different graphical regions, information and/or controls displayed in those graphical regions, etc. In one embodiment, a user may customize such rules by specifying the particular criteria.

Figure 2C:
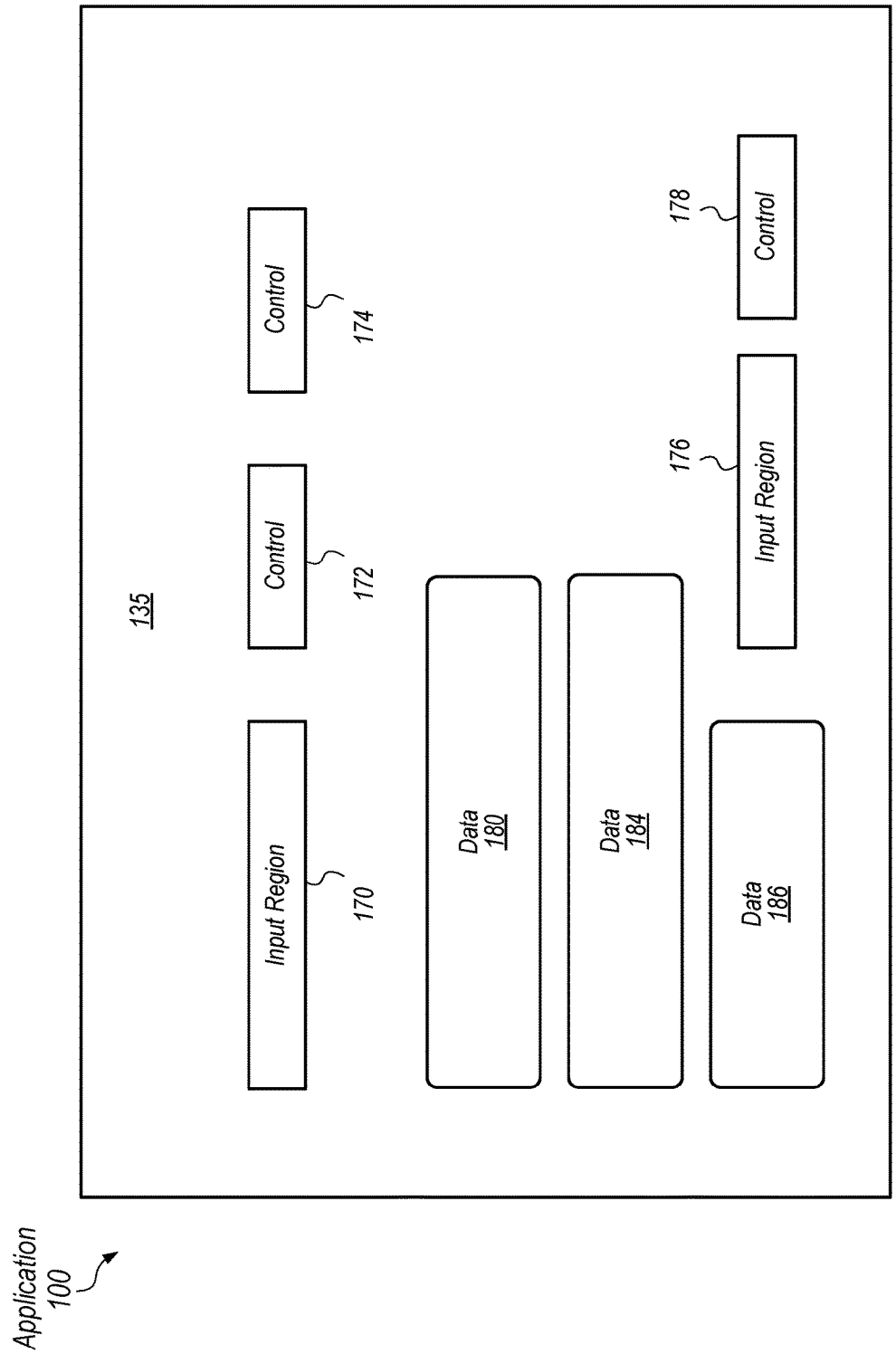

Turning to FIG. 2C, another view of application 100 is shown. In this view, only graphical region 135 is shown at a third level of detail that is greater than the levels of detail of FIGS. 2A and 2B. Likewise, the user's view may transition from that of FIG. 2B to FIG. 2C in response to a particular user input command.

In the embodiment of FIG. 2C, graphical region 135 is shown with the addition of data element 186, input region 176, and control element 178. Data set 182, which was previously visible, has been hidden from view. Thus, any element of a graphical region may be modified in any way—hidden, shown normally, expanded in size, reduced in size, etc.—when transitioning from one view of a graphical region to another view.

Figure 2D:
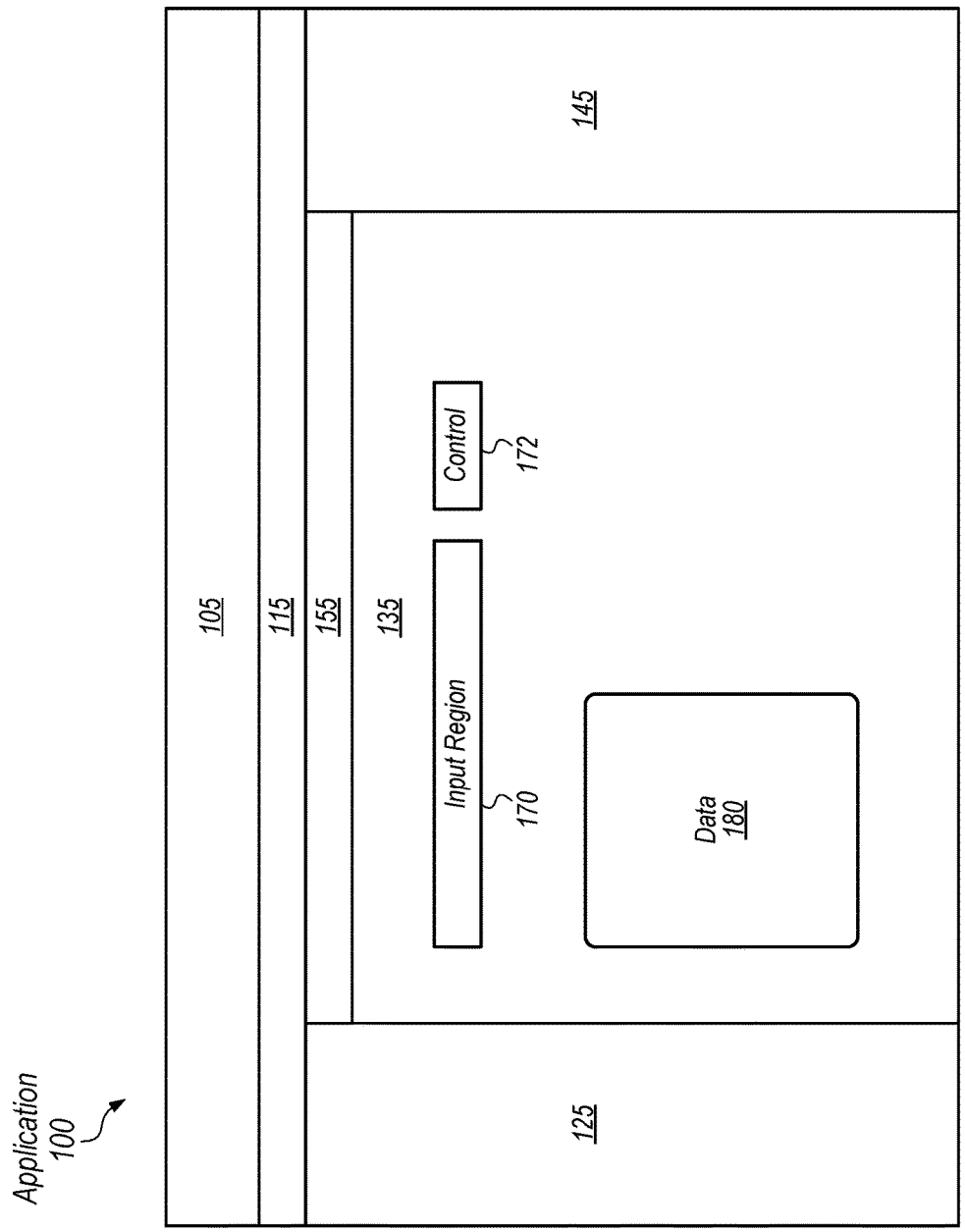

Turning to FIG. 2D, a view of application 100 is shown after another iteration of a user input command that alters the graphical interface is received by application 100. FIG. 2D is identical to the view of FIG. 2A. Thus, in this instance, the user's view has reverted to the same graphical configuration that is shown on FIG. 2A (which illustrates how repeated application of a same user input command may result in a cyclical transition between views of application 100, in various embodiments).

Figure 3:
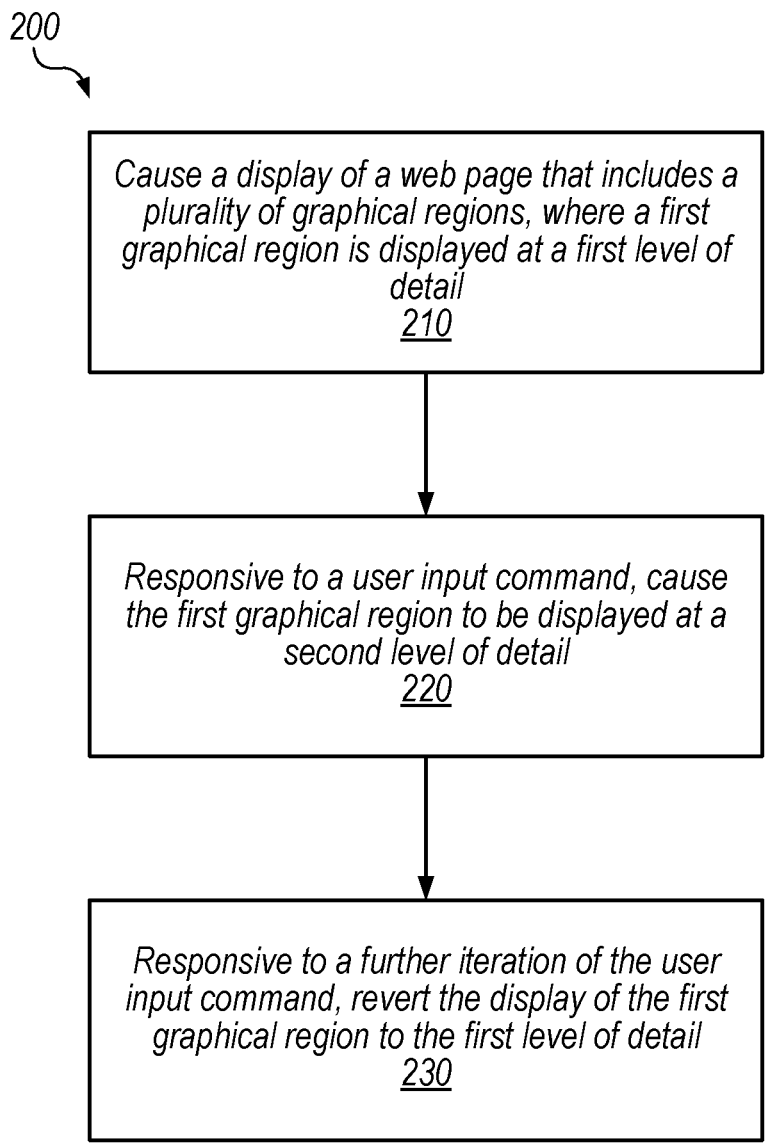
FIG. 3 is a flow diagram illustrating operations that relate to the display and appearance of graphical regions on a screen of a user device, according to some embodiments.

Turning now to FIG. 3, a flowchart 200 is shown of operations that can be implemented by a computer system. These operations relate to the display and appearance of different graphical regions on a screen of a user device. In various embodiments, a computer-readable medium has instructions stored thereon that are capable of causing a computer system to implement the operations of FIG. 3 (or any other techniques discussed herein). The operations of flowchart 200 may be performed, in various embodiments, by any suitable computer system (e.g., a server system, user device, etc.), or multiple computer systems.

In operation 210, a computer system causes a display of a web page (such as web page 102) on a screen of a user device. The displayed web page includes a plurality of distinct graphical regions, in various embodiments, such as those shown in FIG. 2A. Each graphical region is a space defined by a portion of the display screen—for example, a graphical region may be a rectangle defined by the four pixels that make up its corners, or any other shape defined by any method as would occur to one of skill in the art. A graphical region may have numerous different visual elements within it, in various instances, and may overlap another graphical region in some cases.

Each of the graphical regions for operation 210 may also have one or more corresponding data objects implemented by a web page. Thus, a web page that displays different graphical regions may have various underlying data objects that are part of or associated with the web page. In one embodiment, EXT JS (a JAVASCRIPT language) is used to define container data objects that correspond to the graphical regions in a web page. As one with skill in the art will understand, however, any number of web-related technologies (e.g., JAVA, PERL, RUBY, PHP, C#, OBJECTIVE C, VISUAL BASIC, XML, etc.), may be used, sometimes in combination with one another, to define a container data object for a graphical region.

Container data objects for a graphical region of a web page may each have one or more properties. Some of these properties may relate to visibility settings. For example, in one embodiment, a container data object has a property that can be set to indicate whether or not a graphical region will be hidden from view in a display of the web page. In some embodiments, a container data object has multiple properties. These properties may indicate a positioning of a corresponding graphical region (absolute, relative to other graphical regions, or otherwise) and/or include a screen position of the graphical region within a frame of the web page (e.g., an uppermost, left-most pixel), a directional indicator, an orientation, a width, a height, a transparency setting (i.e., opacity), one or more properties relating to overlap of the graphical region with one or more other graphical regions, and/or any other suitable property relating to the display of a graphical region. Elements displayed within a graphical region may likewise have a corresponding data object implemented by a web page, and such objects may have similar or identical properties to those described above (e.g., allowing layout and appearance of text, graphics, input boxes, etc., to be specified).

Relative to operation 210, different graphical regions of a web page may each include a display of one or more sets of data from a database that is connected to web application 100. A "set of data", as used herein, simply refers to one or more items of data. Different items in a set of data may have therefore have one or more relationships with one another (or may be unrelated, in some cases). Thus, a set of data displayed within a graphical region could include various records pertaining to a person, such as name, email address, phone number, age, occupation, etc. A set of data is not limited to one particular data type, and may include various media (still graphic, video, audio, etc.). Thus, an item of data can be any digital information. (Data shown within a graphical region may, in various embodiments, be retrieved from a database such as multi-tenant database system 616, described further below, though is not limited to only this type of database).

In operation 210, the graphical regions shown on a web page include a first graphical region that initially displays a first set of data from a database at a first level of detail. For example, referring to FIG. 2A, graphical region 135 is shown at a first level of detail in which data set 180 is depicted.

In operation 220 of the embodiment of FIG. 3, a user input command causes a first graphical region (e.g., graphical region 135) to be displayed at a second level of detail. The user input command may be a mouse click, one or more keyboard or touchpad presses, any combination thereof, and/or any other type of user input that a computer system can receive.

Displaying a first graphical region at a second level of detail different from a first level of detail (as in operation 220) may include displaying a particular item of a first set of data along with one or more additional items of data that were not previously displayed at the first level of detail. (The first set of data may have been previously displayed when the graphical region was shown at the first level of detail.) All of the data may be from a database such as multi-tenant database 616 (or any other type of database). Accordingly, in one example of operation 220, data sets 182 and 184 are shown in FIG. 2B along with previously displayed data set 180 from FIG. 2A.

Still referring to FIG. 3, in operation 230, a further iteration of a user input command may cause a computer system to revert a display of a first graphical region to a first level of detail at which the graphical region was previously displayed. An example of this operation can be seen in the transition from FIG. 2C to FIG. 2D.

The user input command in operation 230 may be the same command, performed relative to the first graphical region, that was used in operation 220. For example, if the command used for operation 220 was the keystroke 'Z', then the user command used for operation 230 may be another identical pressing of the 'Z' key. Note that performing a user command relative to a first graphical region may, in various embodiments, refer to performing the user command when the first graphical region has been selected. The graphical region may be selected by a user clicking or taking some action on a part of it, in one embodiment, or by the user using a keyboard shortcut (e.g., the TAB key) to select it. In other instances, however, a graphical region may be selected by default (e.g. without explicit user action). In some instances, the selection of a particular graphical region may be made explicit to the user, e.g., by providing a visual indicator to a user. In other instances, selection of a graphical region (in terms of determining the graphical region relative to which a user command is being performed) may not be outwardly indicated to the user (e.g., a particular graphical region may be implicitly, automatically, and/or silently selected). Thus a "default" graphical region for enhancement of detail may be automatically selected for a user in some cases, even if the user has not taken an explicit action to select a particular region.

A user may therefore select any graphical region of a web page at, in various embodiments, by taking an action. Method 200 thus includes receiving a user selection of a first graphical region before that graphical region is displayed at a second level of detail, in one embodiment. Relative to FIG. 2A, for example, a user may select graphical region 135 before entering a user command that causes graphical region 135 to be shown at a second level of detail in FIG. 2B. In other cases, no explicit user selection of graphical region 135 of FIG. 2A needs to be made prior to the user command that causes display at a second (higher) level of detail (i.e., a default region not explicitly selected by the user can be automatically displayed at a different level of detail).

As noted above, repeated application of a user input command can cause a graphical display region to go from an initial display at a first level of detail to a different level of detail at which additional information is shown. At a greatest level of detail, a further iteration of the user command may cause the display to cycle back to an initial display for one or more particular graphical regions. The transition from FIGS. 2C to 2D illustrates one example of this. Thus, transitioning from FIGS. 2A to 2B to 2C, and back to the view of 2D again may be as simple as the user entering three straight input commands, causing the view to cycle.

The user display does not have to simply operate in a linear cycle, however, as discussed above. Many different combinations and permutations of the way graphical regions are shown can occur—particularly if a different graphical region is selected by a user after a first graphical region has already been enhanced by displaying it at a different level of detail. Referring back to FIG. 2B, for example, graphical region 135 is already being displayed at a second level of detail greater than it is displayed in FIG. 2A. Relative to FIG. 2B, a user could then select graphical region 155. With the appropriate user input command, the user can then cause graphical region 155 to be displayed at a greater level of detail, rather than simply continuing to increase a level of detail for graphical region 135.

Thus, a user can select various graphical regions to be displayed at a greater level of detail, even if another region is already being shown at an enhanced level of detail. Thus, in some cases, any displayed graphical region may be "zoomed" on to provide greater detail by entering a particular user input command. In other cases, only certain predefined graphical regions may be "zoomed" in this manner. A particular schema that defines which graphical regions can be enhanced, and in what context, may be implemented in a web page such as web page 102 by defining particular logical rules and/or setting properties for container data objects that correspond to the graphical regions. Thus, depending on circumstances, a particular graphical region can be selected (or not) for display at a greater level of detail upon entry of the proper user command.

The following elaborates on schemas for defining graphical enhancement relative to graphical display regions, and client/server interaction, in some embodiments. A client may receive one or more files from a server (such as a web page, for example). These files may contain data and/or executable instructions, such as HTML, XML, and/or JAVASCRIPT, for example, and may be stored on the server before being transmitted to a client.

A graphical enhancement schema may be defined within one or more files (e.g., received by a client from a server) using executable code and/or related data. For example, a web page may include JAVASCRIPT code that defines different container data objects for graphical regions of the web page. When the web page is loaded locally on a client web browser, execution of the code by the client computer enables the user to enhance graphical regions via a specified user input command. In various instances, because the code corresponding to the web page is loaded locally at the client, it is not necessary for the client to contact the server to enhance display of a particular graphical region (and/or simultaneously diminish a view of another graphical region). Note that when a graphical region is enhanced, additional data may be shown, as described herein. This additional data, in some instances, is already present at the client (e.g., having been transmitted already by the server). In these cases, the client does not need to contact the server to display the additional data when a graphical region is enhanced. (In other instances, however, the client may contact the server to display such data).

Schema information may thus be stored within a web page and/or associated files that are transmitted from a server to a client. This schema information may specify what size a region will become when it is enhanced, what other regions (if any) will be diminished, etc. The schema information may define a variety of contexts in which different responses occur to a user's graphical enhancement command. For example, a schema may specify that if regions A, B, C, and D are all visible but a user has made no explicit selection, region B may be enhanced by default in response to the appropriate user command. Likewise, the schema may further specify that region D is to be diminished when region B is enhanced, in this example. The schema may specify exact pixel sizes of graphical regions when they are changed, or may specify relative size differences, in various embodiments (e.g., the schema may indicate, in this example, that graphical region B is to be enhanced to 150% the size of region A, and that region D is to be diminished to 50% of its original size).

Numerous levels of detail enhancement for one or more particular graphical regions are therefore allowed in some instances. A web page corresponding to FIG. 2A, for example, may specify that at a first initial view, any of regions 125, 135, 145, or 155 can be enhanced to a greater level of detail. The web page may also specify that in the first initial view, regions 105 and 115 cannot be enhanced. Graphical region 155 may only allow for two different levels of detail, while regions 125, 135, and 145 may be defined to have three different allowable levels of detail. Once any region reaches a greatest level of detail allowed, another iteration of a particular user command may cause the user's view to revert back to an initial view (and one or more different graphical regions may be reset to a lesser level of detail as part of this transition). Or, as another example, the web page corresponding to FIG. 2A may allow only a single one of regions 125, 135, and 145 to be enhanced to a third level of detail at a time—that is, if region 135 has been enhanced to a third level of detail as in FIG. 2C, regions 125 and 145 will not be allowed to be further enhanced until region 135 is returned to a lesser level of detail, in one embodiment.

Note that while successive applications of a same user input command may cause a region to be repeatedly enhanced in a cyclical fashion, a different user input command may also allow a user to "zoom out" to a lesser level of detail, in some embodiments. Thus, in the example of FIG. 2A, a user may press "Z" to transition to 2B, and press "Z" again to transition to FIG. 2C. While at the view of FIG. 2B, however, a user could input a different command (such as "X") to revert to the view of FIG. 2A rather than progressing to the view of FIG. 2C. Thus, a first user command that causes a view of a graphical region at a greater level of detail may have an opposite, second command that causes a view of the graphical region at a lesser level of detail, in some embodiments.

Functionality of Web Applications and Display of Graphical Regions

As discussed below, web applications may have various functionality that can be affected, in some cases, by a level of detail at which one or more graphical regions of a web page are displayed.

Web application 100 may include any quantity of different programmed functions, as one of skill in the art will recognize. Web page 102 therefore may include a first function F1, for example, along with a second function F2. These functions, when executed, may cause any variety of behavior to be performed by a user device and/or a server system.

Access to functions for web application 100 may be provided in a variety of different ways. In some cases, a function may be activated at any time (e.g., by selecting a control element and/or by entering an appropriate user command). In other instances, however, a function may only be activated if a particular graphical region is displayed at a specific level of detail, or a function may only be activated if a particular graphical region has been selected.

One or more user commands may cause one or more functions of web page 102 to activate. In one embodiment of web page 102, a first function F1 corresponds to a first graphical region (such as 135), while a second function F2 may correspond to a second graphical region (such as 145). In this embodiment, web page 102 is thus configured to accept a first user command for graphical region 135 to cause function F1 to be activated, and to accept a second user command for graphical region 145 to cause function F2 to be activated. Each of the one or more graphical regions of web page 102, accordingly, may have its own respective functionality.

Thus, in one embodiment, web page 102 is configured so that when a first graphical region is being displayed at a first level of detail, a first programmed function is not accessible, but that first function is accessible when the first graphical region is displayed at a second level of detail. More generally, functions that correspond to a particular graphical region may become accessible or become inaccessible when a displayed level of detail for that graphical region is changed. Though in other instances, as noted above, a function of a web page may remain universally accessible regardless of what level of detail a graphical region is displayed at. Thus, a function corresponding to a graphical region that is hidden from view (such as graphical region 105 in the embodiment of FIG. 2C) may still be activated by a user (e.g., by executing a keyboard shortcut, using a menu, etc.). Accordingly, in some cases, even if a graphical region to which a function relates is not currently being shown, the function can still be accessed.

Re-sizing of Graphical Regions, View Changes, Data Objects

When a first graphical region is displayed at a different level of detail, that graphical region may be resized to become larger or smaller. Likewise, changing a level of detail at which a first graphical region is shown may also cause other graphical regions to be resized (or even disappear from view).

When a user's view transitions from that of FIG. 2A to that of FIG. 2B, for example, graphical regions 125, 135, 145, and 155 are resized to become larger. Note that in this example, numerous graphical regions are re-sized, even though the user command that causes this re-sizing may be performed relative to only one particular graphical region (e.g., region 135). In some embodiments, however, it is not necessary to re-size a graphical region to display it at a different level of detail that includes more (or less) information.

When a graphical region is re-sized, or when a graphical region is displayed at a different level of detail, a wide variety of visual effects may occur. As noted above, data elements, input fields, control elements, etc., may be added or removed from a user's display. Further, however, any visually displayed item may change its appearance. For example, a font size used to display text may increase or decrease, or may change characteristics (e.g., adding or removing bolding, italicization, etc.). A graphical image or logo may be expanded or reduced in size, or substituted for a different graphical image. Color changes may be made to visual elements, and a location of one or more items within a graphical region may also be re-arranged. Thus, any visual aspect of a graphical region may change when it is displayed at a different level of detail.

One or more data objects may be used to represent items that are associated with web page 102, and that may correspond to a particular graphical region. These data objects may be represented internally within web page 102 in various instances, and may include graphical container data objects (e.g., as described above). Thus, causing a graphical region to be displayed at a different level of detail may therefore involve altering one or more properties for a data object corresponding to an item that is viewable within a graphical region. A text field, for example, might have a property FONTSIZE that could be changed from a value of "12 pt" to "14 pt" when a graphical region is re-sized. By changing an internal property of a data object for web page 102, a corresponding visual element on the web page may have its appearance automatically updated. Further, a graphical region itself may have its appearance changed by altering a corresponding data object (e.g., changing a HEIGHT or WIDTH parameter). Note that many different properties of a data object are contemplated and are not limited to the examples above.

Receiving a Web Request and Constructing a Response; Database Operations

Figure 4:
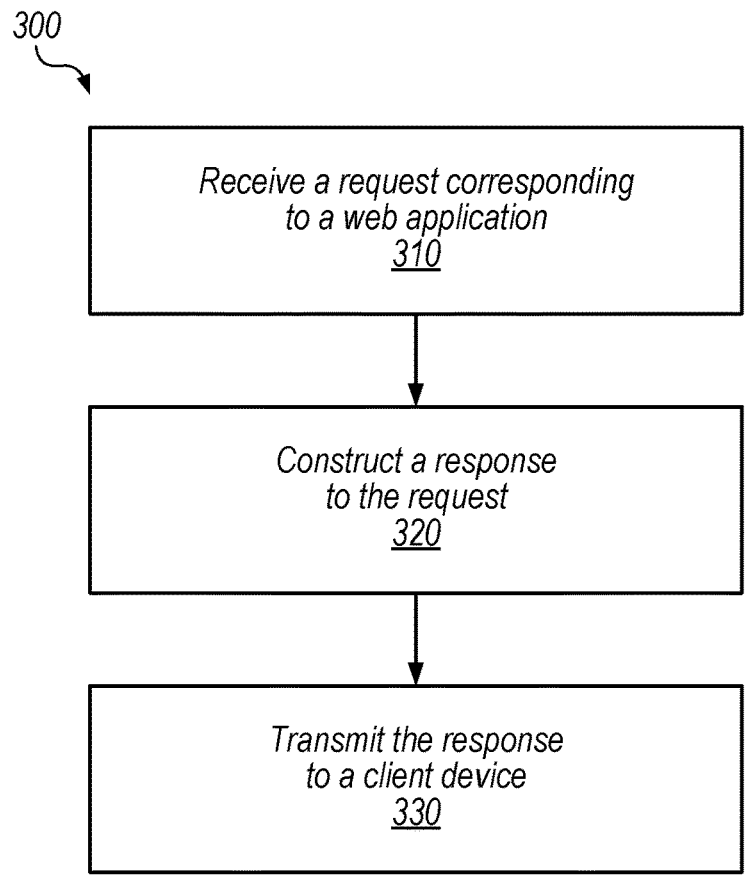
FIG. 4 is a flow diagram illustrating operations that relate to handling a request corresponding to a web application (such as responding to a request for a web page, for example), according to some embodiments.

Turning to FIG. 4, a flowchart 300 is shown of operations that relate to handling a request corresponding to web application 100. In one embodiment, FIG. 4 relates to a web server receiving a request, constructing a response that includes web page 102, and then sending the response to a client device. In various embodiments, a computer-readable medium has instructions stored thereon that are capable of causing a computer system to implement the operations of FIG. 4. The operations of flowchart 300 may be performed, in various embodiments, by any suitable computer system, or multiple computer systems.

In operation 310, a computer system receives a request corresponding to a web application. This request may be an HTTP (hypertext transfer protocol) request for web page 102, in one embodiment. In operation 320, the computer system constructs a response to the request in operation 310. This response may be an HTTP response, for example.

As discussed below, the response that is constructed in operation 320 may include particular data that causes certain actions to occur when the response is received by a user device. For example, the response in operation 320 may include a web page. The response is then transmitted to a user device in operation 330.

The response transmitted to a user device in operation 330 may therefore include web page 102 in one embodiment. This web page, when received by a browser application of the user device, may cause the browser to perform operations that include any portions of method 200 as discussed above relative to FIG. 3. Thus, data transmitted in operation 330, when received by a browser application of a user device, may cause the browser to cause display of a web page on a screen of the user device. The web page may include a plurality of graphical regions (e.g., such as those of FIG. 2A). Each graphical region may further include a respective set of data from a database.

A computer system may use data from a database to construct a web response in some embodiments related to FIG. 4. For example, referring to FIG. 2B, any of data sets 180, 182, or 184 may include data that has been retrieved from a database such as multi-tenant database 616 (described further below).

When a graphical region is shown at a different level of detail (e.g., expanded to include more information), additional data from a database may be shown on web page 102. Notably, however, it is not necessary for a client device to make an (additional) specific request to a server system for this extra data, in various embodiments. Web page 102 may be sent to a client device already containing additional information that is simply not shown to a user initially, but that can be revealed when a graphical region is expanded. Thus, in various instances, when a graphical region changes its level of displayed detail, web page 102 may show additional items of data without having to query a database. (In other embodiments, however, a request for additional data may be transmitted by a client device to a server system when a detail level for a graphical region is changed, but the client device does not already possess all information that it needs to show the graphical region at the new level of detail).

Computer-Readable Medium

Figure 5:
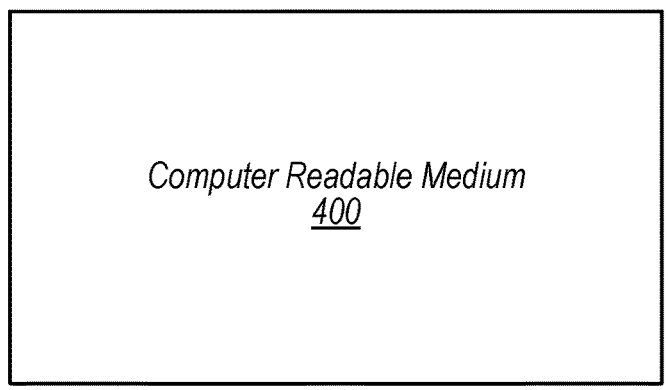
FIG. 5 illustrates a computer-readable medium, according to some embodiments.
Figure 6:
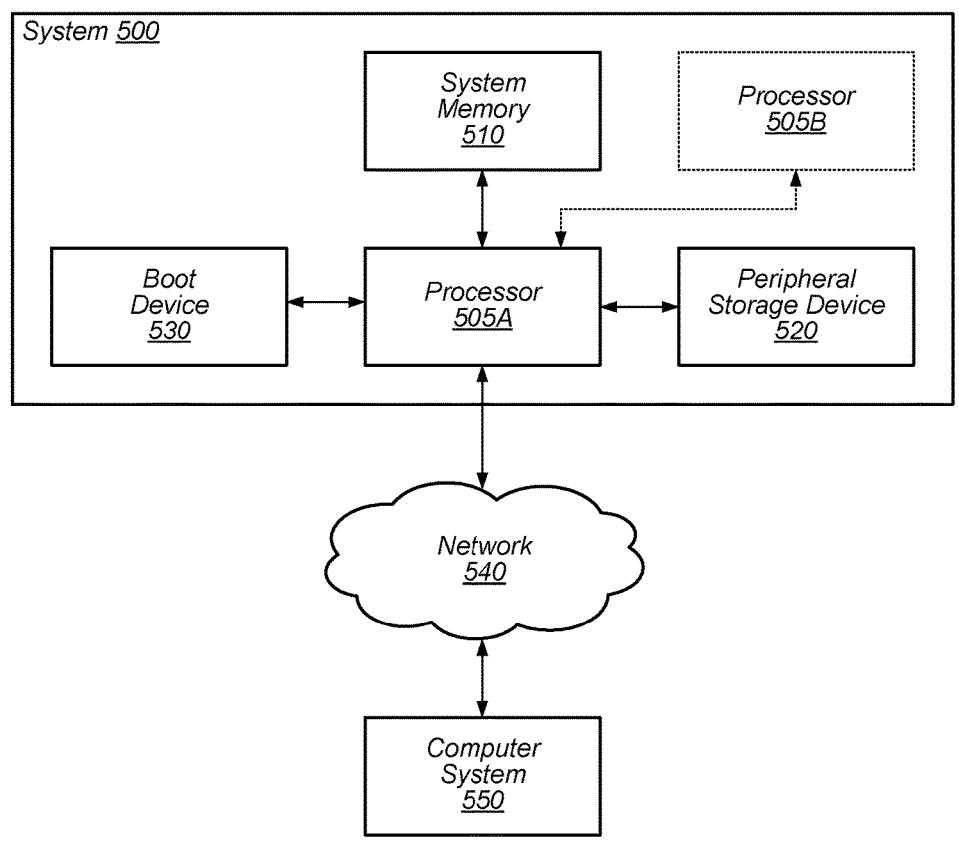
FIG. 6 illustrates a computer system, according to some embodiments.

Turning briefly to FIG. 5, a block diagram of one embodiment of a computer-readable medium 400 is shown. This computer-readable medium may store instructions corresponding to the operations of FIG. 3, FIG. 4, and/or any other techniques described herein. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript. Note that as used herein, the term "computer-readable medium" refers to a non-transitory computer readable medium.

Computer System

In FIG. 5, one embodiment of a computer system 500 is illustrated. Various embodiments of this system may be a user device, a server system, or any other computer system as discussed above and herein.

In the illustrated embodiment, system 500 includes a first processor 505A, which is coupled to a system memory 510, a peripheral storage device 520 and a boot device 530. System 500 is coupled to a network 540, which is in turn coupled to another computer system 550. In some embodiments, system 500 may include more than one instance of the devices shown. In various embodiments, system 500 may be configured as a rack-mountable server system, a standalone system, or in any other suitable form factor. In some embodiments, system 500 may be configured as a client system rather than a server system. System 500 may be a smartphone, tablet, laptop, or appear in any other configuration that would occur to one with skill in the art.

In some embodiments, system 500 may be configured as a multiprocessor system, in which processor 505A may optionally be coupled to one or more other instances of a processor, such as processor 505B. For example, processors 505A-B may be coupled to communicate via respective coherent processor interfaces. In one embodiment, processor 505A is a CPU, while processor 505 is a GPU, though system 500 is not thus limited.

In various embodiments, system memory 510 may comprise any suitable type of system memory as described above, such as FB-DIMM, DDR/DDR2/DDR3/DDR4 SDRAM, or RDRAM®, for example. System memory 510 may include multiple discrete banks of memory controlled by discrete memory interfaces in embodiments of processor 100 that provide multiple memory interfaces. Also, in some embodiments, system memory 510 may include multiple different types of memory.

Peripheral storage device 520, in various embodiments, may include support for magnetic, holographic, optical, or solid-state storage media such as hard drives, optical disks, nonvolatile RAM devices, etc. In some embodiments, peripheral storage device 520 may include more complex storage devices such as disk arrays or storage area networks (SANs), which may be coupled to processor 100 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 100, such as multimedia devices, graphics/display devices, standard input/output devices, etc. In one embodiment, peripheral storage device 520 may be coupled to processor 505A via peripheral interface(s). In one embodiment a boot device 530 may include a device such as an FPGA or ASIC configured to coordinate initialization and boot up of system 500, such as from a power-on reset state.

Network 540 may include any suitable devices, media and/or protocol for interconnecting computer systems, such as wired or wireless Ethernet, for example. In various embodiments, network 540 may include local area networks (LANs), wide area networks (WANs), telecommunication networks, or other suitable types of networks. In some embodiments, computer system 550 may be similar to or identical in configuration to illustrated system 500, whereas in other embodiments, computer system 550 may be substantially differently configured. For example, computer system 550 may be a server system, a processor-based client system, a stateless "thin" client system, a mobile device, etc.

Exemplary Multi-Tenant Database System

Figure 7:
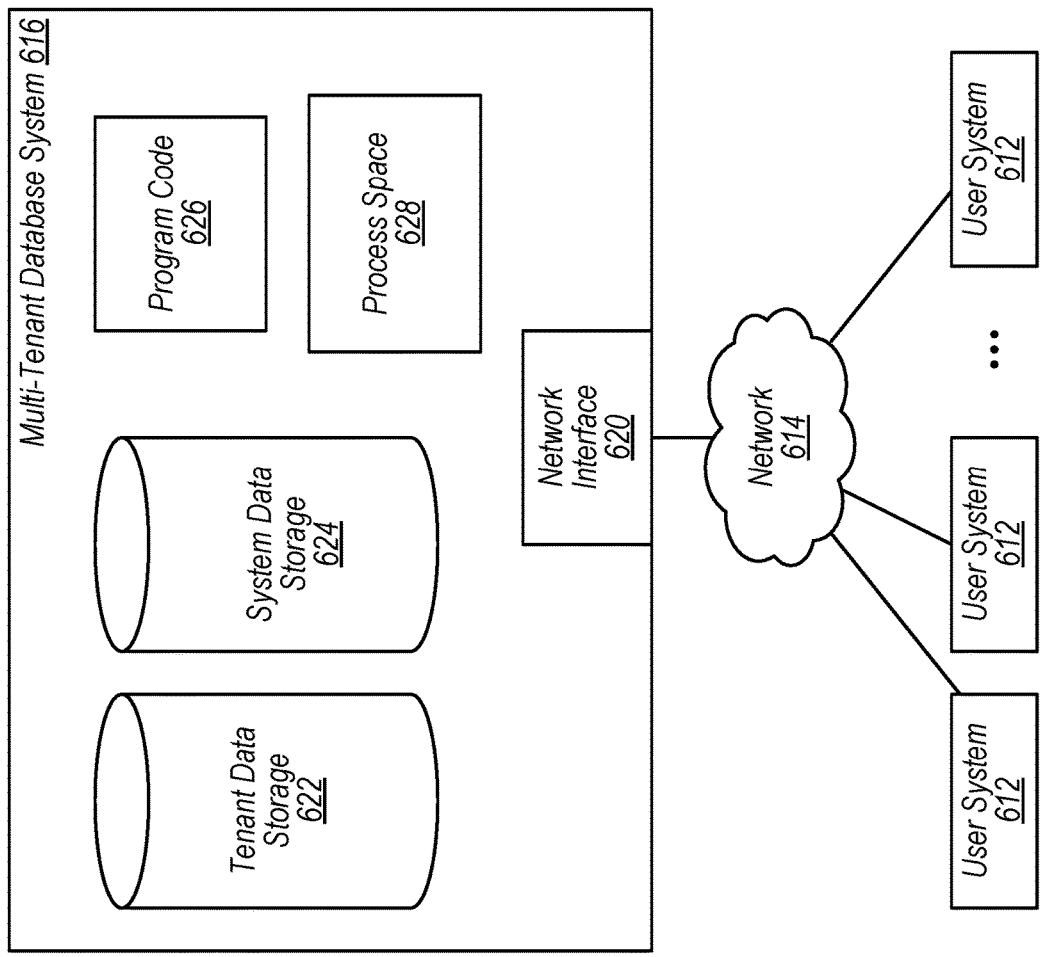
FIG. 7 illustrates a multi-tenant database system, according to some embodiments.

Turning to FIG. 7, an illustration is shown of illustrates an exemplary environment in which a multi-tenant database system might be implemented. Multi-tenant database 616, as shown, may function as part of computer system 500 in some embodiments. Further, multi-tenant database 616 may supply data for display within graphical regions of a web page. Thus, any of the graphical regions shown in FIGS. 2A-2D, for example, may include data that has been retrieved from multi-tenant database 616.

As illustrated in FIG. 7 (and in more detail in FIG. 8) one or more user systems 612 may interact via a network 614 with a multi-tenant database system (MTS) 616. The users of those user systems 612 may be users in differing capacities and the capacity of a particular user system 612 might be determined by the current user. For example, when a salesperson is using a particular user system 612 to interact with MTS 616, that user system 612 may have the capacities allotted to that salesperson. However, while an administrator is using the same user system 612 to interact with MTS 616, it has the capacities allotted to that administrator.

Network 614 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 612 may communicate with MTS 616 using TCP/IP and, at a higher network level, use other common Internet protocols to communicate, such as HTTP, FTP, AFS, WAP, etc. As an example, where HTTP is used, user system 612 might include an HTTP client for sending and receiving HTTP messages from an HTTP server at MTS 616. Such a server might be implemented as the sole network interface between MTS 616 and network 614, but other techniques might be used as well or instead. In some implementations, the interface between MTS 616 and network 614 includes load sharing functionality, such as round-robin HTTP request distributors to balance loads and distribute incoming HTTP requests evenly over a plurality of servers. Each of the plurality of servers has access to the MTS's data, in various embodiments, at least for the users that are accessing a server.

In some embodiments, the system shown in FIG. 7 implements a web-based customer relationship management (CRM) system. For example, in some embodiments, MTS 616 includes application servers configured to implement and execute CRM software applications as well as provide related data, code, forms, web pages and other information to and from user systems 612 and to store to, and retrieve from, a database system related data, objects and web page content. In one embodiment of multi-tenant system 616, tenant data is arranged so that data of one tenant is kept separate from that of other tenants so that that one tenant does not have access to another tenant's data, unless such data is expressly shared.

One arrangement for elements of MTS 616 is shown in FIG. 7, including a network interface 620, storage 622 for tenant data, storage 624 for system data accessible to MTS 616 and possibly multiple tenants, program code 626 for implementing various functions of MTS 616, and a process space 628 for executing MTS system processes and tenant-specific processes, such as running applications as part of an application service.

Each user system 612 may be a desktop personal computer, workstation, laptop, PDA, cell phone, or any WAP-enabled device or any other computing device capable of interfacing directly or indirectly to the Internet or other network connection. User system 612 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 612 to access, process, and view information and pages available to it from MTS 616 over network 614. Each user system 612 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 616 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 612 and its components are operator configurable using applications, such as a browser, that include computer code executable on one or more processing elements. Similarly, in some embodiments, MTS 616 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements.

According to one embodiment, each MTS 616 is configured to provide web pages, forms, applications, data, and/or media content to user systems 612 to support the access by user systems 612 as tenants of MTS 616. As such, in this embodiment, MTS 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline back-ups or other redundancies, etc., and might include a distributed database or storage network and associated processing intelligence.

Figure 8:
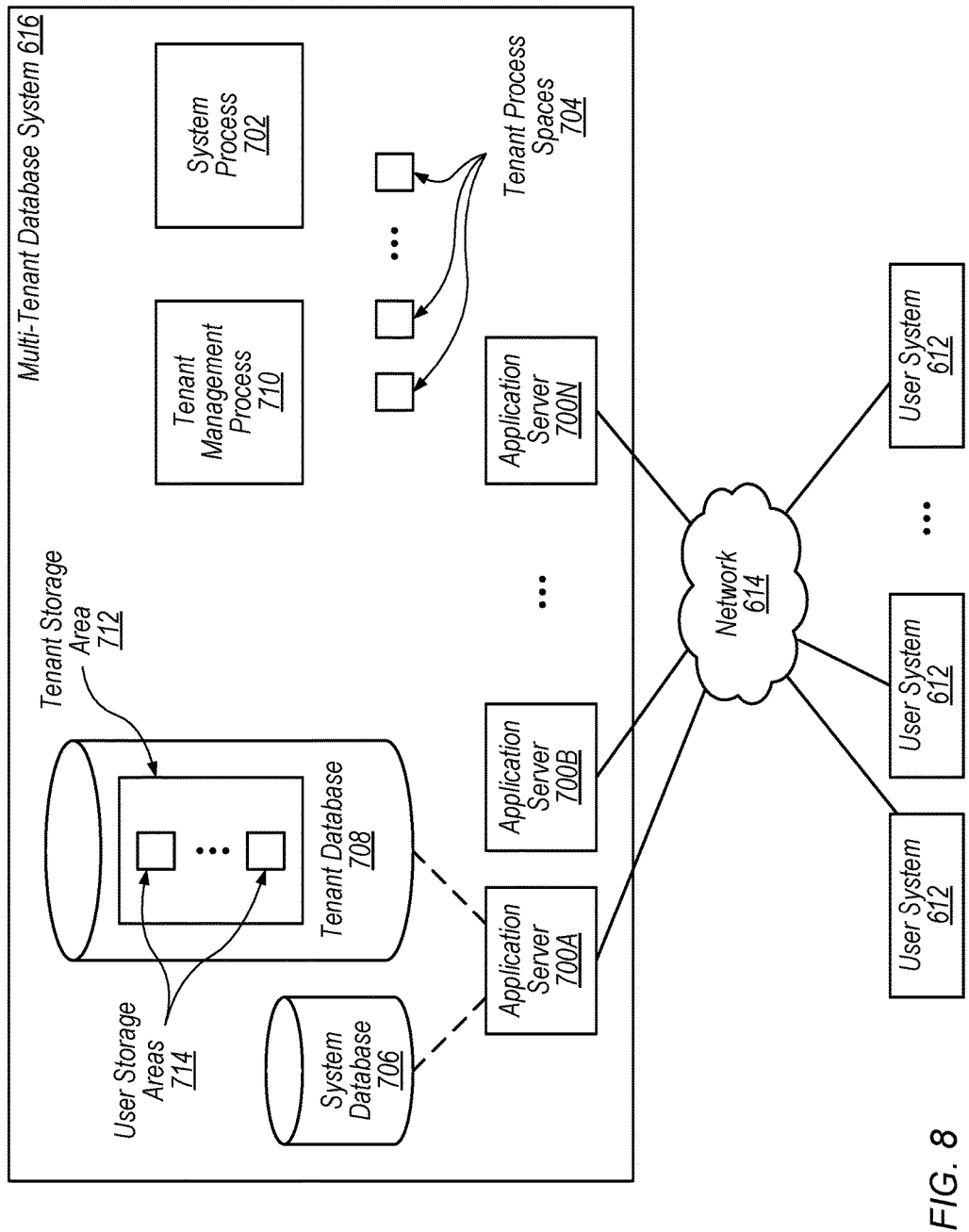
FIG. 8 illustrates further details regarding a multi-tenant database system, according to some embodiments.

FIG. 8 illustrates certain embodiments of an MTS 616 and various interconnections in more detail. In this example, the network interface is implemented as one or more HTTP application servers 700. Also shown is system process space 702 including individual tenant process spaces 704, a system database 706, tenant database(s) 708 and a tenant management process space 710. Tenant database 108 might be divided into individual tenant storage areas 712, which can be either a physical arrangement or a logical arrangement. Within each tenant storage area 712, user storage 714 might be allocated for each user.

In certain aspects, each application server 700 is configured to handle requests for any user/organization. Because it may be desirable to be able to add and remove application servers from the server pool at any time for any reason, there is not necessarily a server affinity for a user and/or organization to a specific application server 700. In one embodiment, therefore, an interface system (not shown) implementing a load balancing function (e.g., an F5 Big-IP load balancer) is communicably coupled between the servers 700 and the user systems 612 to distribute requests to the servers 700. In one aspect, the load balancer uses a least connections algorithm to route user requests to the servers 700. Other examples of load balancing algorithms, such as are round robin and observed response time, also can be used. For example, in certain aspects, three consecutive requests from the same user could hit three different servers, and three requests from different users could hit the same server. In this manner, MTS 616 is multi-tenant in one or more embodiments, wherein the MTS 616 handles storage of different objects and data across disparate users and organizations.

As an example of storage, one tenant might be a company that employs a sales force where each salesperson uses MTS 616 to manage their sales process. Thus, a user might maintain contact data, leads data customer follow-up data, performance data, goals and progress data, all applicable to that user's personal sales process (e.g., in tenant database 708). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 616 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 616 might also maintain system level data usable by multiple tenants. Such system level data might include industry reports, news, postings, and the like that are sharable among tenants.

In certain aspects, client systems 612 communicate with application servers 700 to request and update system-level and tenant-level data from MTS 616 that may require one or more queries to database system 706 and/or database system 708. In some embodiments, MTS 616 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc.

* * *

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, etc.). For example, in web page having multiple different graphical regions, the terms "first" and "second" can be used to refer to any two of the graphical regions. In other words, the "first" and "second" graphical regions are not limited being particular ones of the graphical regions.

Various components may be described or claimed as "configured to" or "configurable to" perform a task or tasks. In such contexts, these terms are used to connote structure by indicating that the components include structure (e.g., stored logic) that performs the task or tasks during operation. As such, the component can be said to be configured or be configurable to perform the task even when the component is not currently operational (e.g., is not on). Reciting that a component is "configured to" perform one or more tasks is expressly intended not to invoke 35 U.S.C. § 112(f) for that component.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed by various described embodiments. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having instructions stored thereon that are configurable to cause a computer system to implement operations comprising:

receiving, from a server computer system, web page information specifying a web page having a plurality of distinct graphical regions;

displaying the web page on a screen of a user device such that the distinct graphical regions of the web page depict information representative of a corresponding set of data from a database, wherein the displayed distinct graphical regions include a first graphical region that initially displays a first set of data from the database at a first level of detail and a second graphical region that initially displays a second set of data from the database;

responsive to a first user input command, causing the first graphical region to be displayed at a second level of detail and hiding all or a portion of the second graphical region from view, wherein displaying the first graphical region at the second level of detail includes displaying a particular item of the first set of data along with one or more additional items of data from the database that are not displayed at the first level of detail;

while the second graphical region is removed from view and responsive to a second user input command that is different from the first user input command performing a function that is related to the second set of data and is not related to transitioning between the various levels of detail; and responsive to a further iteration of the first user input command, causing at least a hidden portion of the second graphical region to be displayed.

2. The non-transitory computer readable medium of claim 1, wherein the operations further comprise receiving a first user selection, via a user input device, of the first graphical region prior to receiving the first user input command; and wherein causing the first graphical region to be displayed at the second level of detail is based on the first user selection of the first graphical region.

3. The non-transitory computer readable medium of claim 1, wherein the operations further comprise, subsequent to causing the first graphical region to be displayed at the second level of detail:

receiving a user selection of a third graphical region; and responsive to receiving an iteration of the same first user input command, causing the third graphical region to be displayed at a greater level of detail than previously shown.

4. The non-transitory computer readable medium of claim 1, wherein causing the first graphical region to be displayed at the second level of detail is based on an automatic selection of the first graphical region by the computer system, and is not based on a user selection of the first graphical region received via a user input device.

5. The non-transitory computer readable medium of claim 1, wherein the web page is configured to accept a third user input command for the first graphical region and a fourth user input command for the second graphical region;

wherein the third user input command causes a third programmed function of the web page to be activated; and wherein the fourth user input command causes a fourth programmed function of the web page to be activated, wherein the third and fourth programmed functions are different.

6. The non-transitory computer readable medium of claim 1, wherein the web page is configured such that when the first graphical region is being displayed at the first level of detail, a first programmed function of the web page is not accessible, but is accessible when the first graphical region is being displayed at the second level of detail.

7. The non-transitory computer readable medium of claim 1, wherein the web page is configured such that when the first graphical region is being displayed at the first level of detail, a second programmed function is accessible for the second graphical region, but is not accessible when the first graphical region is being displayed at the second level of detail.

8. The non-transitory computer readable medium of claim 1, wherein the web page includes a plurality of data elements, each of which corresponds to a respective one of the graphical regions; and wherein causing the first graphical region to be displayed at the second level of detail comprises altering one or more properties of a first one of the data elements for the first graphical region, and comprises altering one or more properties of a second one of the data elements for the second graphical region.

9. The non-transitory computer readable medium of claim 1, wherein the operations further comprise:

responsive to the further iteration of the first user input command, reverting the display of the first graphical region to the first level of detail.

10. A method, comprising:

receiving, at a server system, a request corresponding to a web application;

the server system constructing a response to the request; and the server system transmitting the response to a user device, wherein the response comprises data that, when received by a browser application of the user device, causes the browser to perform operations comprising:

causing display of a web page on a screen of the user device such that the distinct graphical regions of the web page depict information representative of a corresponding set of data from a database, and wherein the displayed distinct graphical regions include a first graphical region that initially displays a first set of data from the database at a first level of detail and a second graphical region that initially displays a second set of data from the database;

responsive to a first user input command, causing the first graphical region to be displayed at a second level of detail and hiding all of a portion of the second graphical region from view, wherein displaying the first graphical region at the second level of detail includes displaying a particular item of the first set of data along with one or more additional items of data from the database that are not displayed at the first level of detail;

while the second graphical region is removed from view and responsive to a second user input command that is different from the first user input command performing a function that is related to the second set of data and is not related to transitioning between the various levels of detail; and responsive to a further iteration of the first user input command, causing at least a hidden portion of the second graphical regions to be redisplayed.

11. The method of claim 10, wherein causing the first graphical region to be displayed at the second level of detail includes increasing a physical display size of the first graphical region.

12. The method of claim 10, wherein at the second level of detail, a first of the one or more additional items of data has a corresponding graphical element in the web page that can be selected by a user to cause execution of a programmed function of the web page, wherein the programmed function is not available when the first graphical region is displayed at the first level of detail.

13. The method of claim 10, wherein the web page is configured to display the one or more additional items of data from the database without having to make a specific request to a server system for the one or more additional items of data.

14. The method of claim 10, wherein the first user input command is one or more keystrokes.

15. A non-transitory computer readable medium having instructions stored thereon that are capable of causing a computer system to implement operations comprising:

receiving a request corresponding to a web application;

constructing a response to the request; and transmitting the response to a user device, wherein the response comprises data that, when received by a browser application of the user device, causes the browser to perform operations comprising:

causing display of a web page on a screen of the user device such that the distinct graphical regions, each corresponding to a respective one of a plurality of container data objects implemented by the web page, and depicting information representative of a corresponding set of data from a database, and wherein the displayed distinct graphical regions include a first graphical region that initially displays a first set of data from the database at a first level of detail and a second graphical region that initially displays a second set of data from the database;

responsive to a first user input command, causing the first graphical region to be displayed at a second level of detail and hiding all or a portion of the second graphical region from view by adjusting at least a first setting of a first one of the plurality of container data objects and a second setting of a second one of the plurality of container data objects, wherein displaying the first graphical region at the second level of detail includes displaying a particular item of the first set of data along with one or more additional items of data from the database that are not displayed at the first level of detail; and while the second graphical region is removed from view and responsive to a second user input command that is different from the first user input command performing a function that is related to the second set of data and is not related to transitioning between the various levels of detail; and responsive to a further iteration of the first user input command, causing at least a hidden portion of the second graphical region to be displayed.

16. The non-transitory computer readable medium of claim 15, wherein the operations further comprise:

receiving, subsequent to the request, a second request from the user device, wherein the second request corresponds to causing the first graphical region to be displayed at the second level of detail;

responsive to the second request:

accessing the database to acquire the one or more additional items of data; and transmitting the one or more additional items of data to the user device.

\* \* \* \* \*